No. 884,082. PATENTED APR. 7, 1908.
C. J. FANCHER & H. S. PARMELEE.
ENVELOP SEALING MACHINE.
APPLICATION FILED FEB. 23, 1907.

WITNESSES
P. H. Martin.
J. M. Sterne

INVENTORS
Charles J. Fancher,
Hubert S. Parmelee,
BY
Webster & Co.,
ATTORNEYS

UNITED STATES PATENT OFFICE.

CHARLES JAMES FANCHER AND HUBERT SYLVESTER PARMELEE, OF WEST GRANBY, CONNECTICUT, ASSIGNORS TO THE SIMPLEX MANUFACTURING COMPANY, OF NEW YORK, N. Y., A CORPORATION OF CONNECTICUT.

ENVELOP-SEALING MACHINE.

No. 884,082.　　　Specification of Letters Patent.　　　Patented April 7, 1908.

Application filed February 23, 1907. Serial No. 358,861.

*To all whom it may concern:*

Be it known that we, CHARLES JAMES FANCHER and HUBERT SYLVESTER PARMELEE, both citizens of the United States of America, and residents of West Granby, in the county of Hartford and State of Connecticut, have invented new and useful Improvements in Envelop-Sealing Machines, of which the following is a specification.

Our invention relates to improvements in automatic machines for sealing envelops, and more particularly to the type of machine covered by United States Letters Patent, No. 812,236, issued to us February 13th, 1906, and to that included in our application for United States Letters Patent, filed December 21st, 1906, and serially numbered 348,919, with which latter the present invention is closely associated, and said invention consists of certain peculiar stop and releasing fingers for the unsealed envelops, with the operating mechanism therefor, of certain peculiar gripping-fingers for the envelop after its flap has been moistened, with the operating mechanism therefor, of a ratchet for the driving or actuating mechanism of the machine, and of other new and improved features of construction in some of the parts, combinations of parts and mechanisms, all as hereinafter set forth.

The objects of our invention are, first, to afford means in a machine of the class above mentioned for confining the unsealed envelops on the upper support, for removing them one at a time from such support and transferring them to the lower support, and for sealing and confining them at or on such lower support; second, to provide positive means for drawing the envelop down after the moistening of its flap takes place; third, to furnish a device for controlling the driving or actuating mechanism whereby such mechanism is prevented from being operated in the wrong direction by an inexperienced person or any one else without first manipulating such device so as to permit said mechanism to be reversed; fourth, to improve other working parts of the machine to the end that better results shall be secured therewith, and, fifth, to generally enhance the value and efficiency of the machine. We attain these objects by the means and mechanism illustrated in the accompanying drawings, in which—

Fig. 9, an enlarged rear view of the lower portion of the depressor-plate; Fig. 10, a sectional view of the same; Fig. 11, an enlarged side view of the gripping-fingers and appurtenances, and, Fig. 12, a front view of said fingers and appurtenances.

Parts of the supporting rods for the envelops and of the oscillating arm for the presser-plate are broken off or out of such members, wherever they appear in the drawings, in order to economize space.

Arrows indicate the directions of rotary parts.

Similar figures refer to similar parts throughout the several views.

It will be understood that we have illustrated only so much of the frame and other parts of the envelop machine as are necessary for a clear comprehension of the present invention, and that in some cases old parts shown are in practice employed in pairs, while in other cases features important to the machine as a whole are here omitted for the reason that they do not enter directly into combination or intimate relationship with the new features embraced in this application. As examples of what is meant by the foregoing, attention is called to the fact that the frame of the machine in reality comprises two sides, but only one of those sides and a fragment of the other appear in the drawings, and the abutment rollers which are provided in the machine described in the application herein first mentioned to act in conjunction with the depressor-plate on an envelop, are left out.

The frame of the machine consists in the present instance of two sides or uprights 1 and 2 connected by suitably arranged and proportioned cross-pieces 3, 4, 5 and 6. The upper or delivery platform or support for the unsealed envelops and the lower or receiving platform or support for the sealed envelops consist of inclined rods 7 having their rear ends tapped into the cross-pieces 4 and 6 and extending forward and upward from said cross-pieces. Each support comprises four rods 7 in this case, but the number may vary. The object of slanting the rods 7 is so that the envelops supported thereon will have a constant tendency to gravitate toward the stop members and thus be always ready and in condition to be properly handled and sealed. A horizontal delivery plate 8, slotted at 9 to accommodate the upper rods 7, is fastened to the top of the cross-piece 4 and extends beyond the front edge of the same. This plate forms part of the upper envelop support. A horizontal plate 10 fastened to the cross-piece 5 carries the water-tank or reservoir 11 and supports a vertical backing-plate 12 against the front face of which latter the flap of an envelop is pressed by a depressor-plate 13 for the envelop. The backing-plate 12 is secured to a depending part 14 at the front end of the plate 10, and said plate 12 extends both above and below said plate 10. The water in the reservoir is utilized through the medium of an absorbent mass 15.

Mounted on the rods which constitute the upper and lower envelop supports are two followers 16 for the envelops. These followers have grooves 17 in their outer faces to receive the rods 7 by which the followers are supported and guided, the guidance resulting from the presence of said grooves. Gravity and the inclinations of the rods 7 give the followers 16 a downward and rearward tendency so that they bear against whatever envelops may be behind them and assist in keeping the latter bunched to the end that those from the upper package are properly fed to the moistening and sealing mechanism and those in the lower package are properly sealed. Each follower shown is merely a piece of sheet-metal bent to form two arms having the proper angular relation to each other and to the rods and the envelops thereon, being preferably rounded at the junction of said arms, with the grooves 17 in the outer faces of the arms and a handle 18 extending between the inner faces of the arms in the center. This construction permits the follower to be used either side up, that is, either arm can be mounted on the rods 7 with the other arm against the envelops, which renders the device more than ordinarily convenient.

We are able by inclining our supporting rods 7 to make use of the simple follower above described and get better results than with any of the various kinds of spring tension devices which we have tried. Here all more or less complicated and expensive mechanisms for keeping the envelops always properly bunched are displaced by a simple and inexpensive expedient or device with which, as already noted, the work is done to better advantage than heretofore.

In practice a bunch or package of envelops 19 is placed on the upper supporting rods 7 between the follower 16 thereon and other members, and the envelops are removed one by one from this package, moistened and finally deposited on the lower supporting rods 7 between the follower 16 thereon and other members. The members with which the two followers are intimately associated will be mentioned in detail in the course of this description. The unsealed envelops 19 are so placed on the upper support that their flaps are at the bottom and toward the rear.

Behind the envelops on the upper support and restraining them except as they are regularly removed one at a time, are a vertically reciprocating stop- and flap- opening plate 20 and two stop-fingers 21. The stop-fingers 21 are not in contact with the package of envelops all the time, but are intermittently operated to recede from the position of contact and to resume such position. What may be considered as the normal position of the fingers 21 is the one in which they stand substantially upright back of the package of envelops at or near the bottom thereof. Each finger 21 has its front end pivoted at 22 to ears 23 depending from the plate 8 both sides of a slot 24 in said plate for said finger. The cross-piece 4 is recessed at 25 to accommodate the ears 23 and the front end of the finger 21. On the back or under side of the finger 21, according to the position of said finger, is an ear 26 to which the upper end of a link 27 is pivoted at 28. The lower end of the link 27 is pivoted at 29 to the front end of a cam arm 30. A supporting lug 31 for the arm 30 has its front terminal tapped into the cross-piece 4 from the back. The rear end of the arm 30 is pivoted at 32 to the corresponding end of the lug 31. The arm 30 is provided at the rear end with a cam projection 33 and at the front end with a buffer projection 34. A spring 35, coiled around a screw 36, has one end caught by a horn 37 on an adjustable lug or tension regulator or adjuster 38 and the other end thrust through an opening in the buffer projection 34 of the arm 30, and positions said arm with its projection 33 in the path of a cam 39 on the main shaft 40. The screw 36 is tapped into the cross-piece 4 below and at one side of the lug 31 and confines the adjuster 38 between said cross-piece and a shoulder 41 on said screw. By loosening the screw 36 the adjuster 38 can be turned in one direction or the other, as may be necessary, to increase or decrease the tension of the spring 35 on the arm 30, accordingly as it is desired to increase or decrease said tension, when said screw is again tightened. The projection 34 has a foot-piece 42 which is received by a buffer 43, of leather or other suitable material, let into the cross-piece 4 in front of said foot-piece. The buffer 43 is adjusted horizontally, so as to have the proper projection behind the cross-piece 4 and for the purpose of compensating for wear, by means of a screw 44 tapped into said cross-piece from the front side thereof. The office of the buffer is to prevent undue shock or jar when the cam 39 rides clear of the operating arm for the finger 21 and releases said arm to its spring, it also serves to limit the upward movement of said finger. The same operating, coacting and correlated parts are provided for both fingers.

Figure 4:
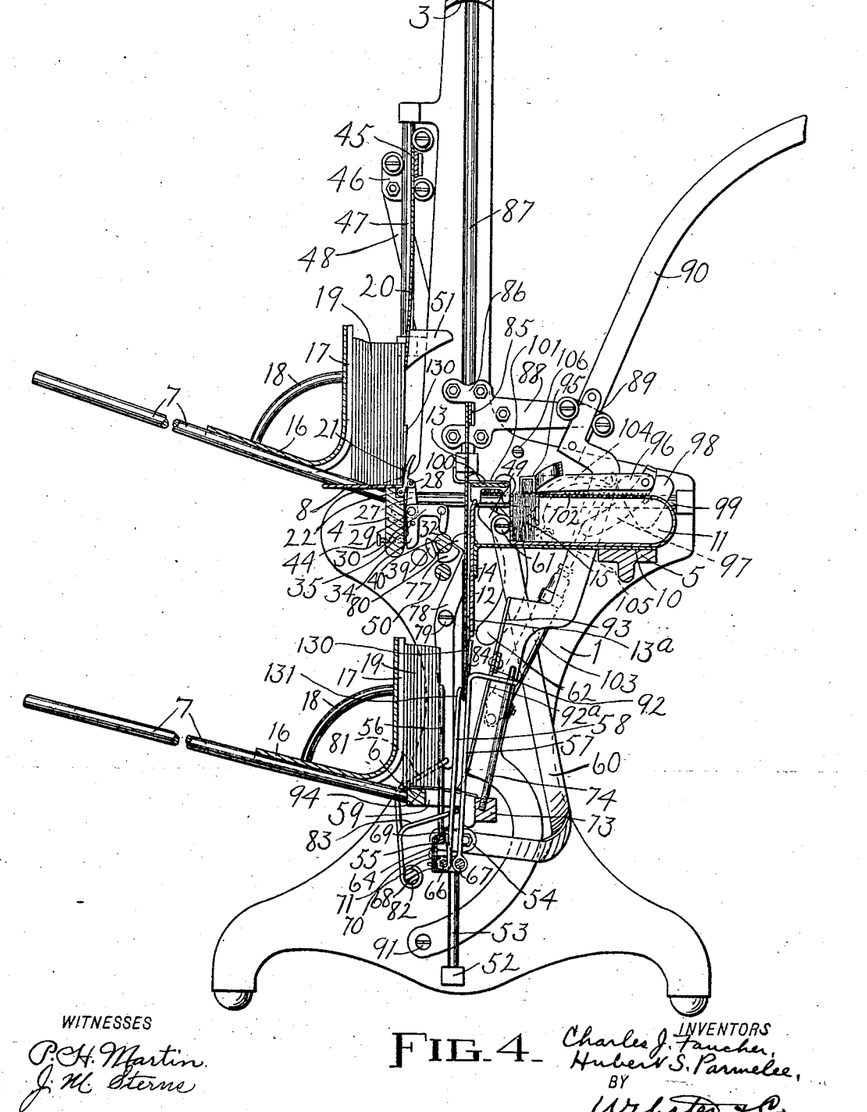
Fig. 4, a vertical section of said machine, looking toward the side shown in Fig. 1.
Figures 5, 6:
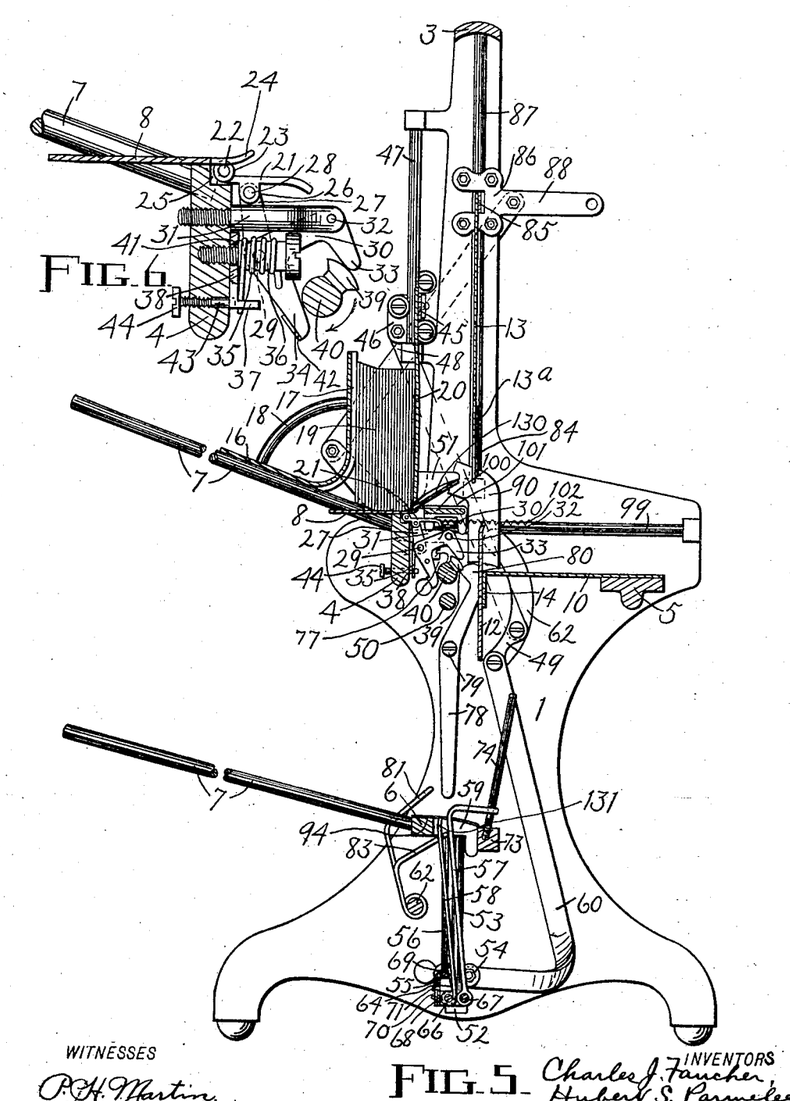
Fig. 5, a similar section without some of the members which appear in the preceding section and showing those members which do appear positioned differently.
Fig. 6, an enlarged side elevation of one of the stop-finger appliances, the finger being in its horizontal or retracted position.
Figure 7:
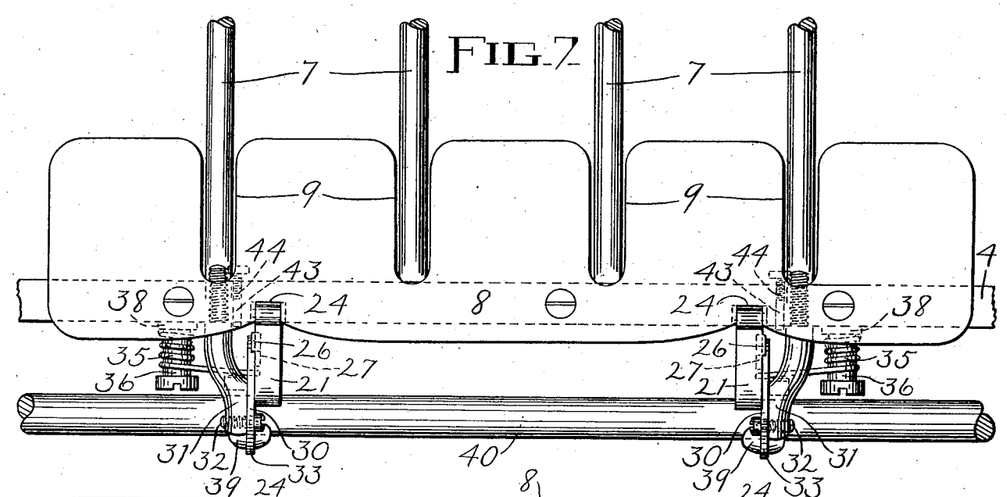
Fig. 7, an enlarged plan view of both of the stop-finger appliances.
Figure 8:
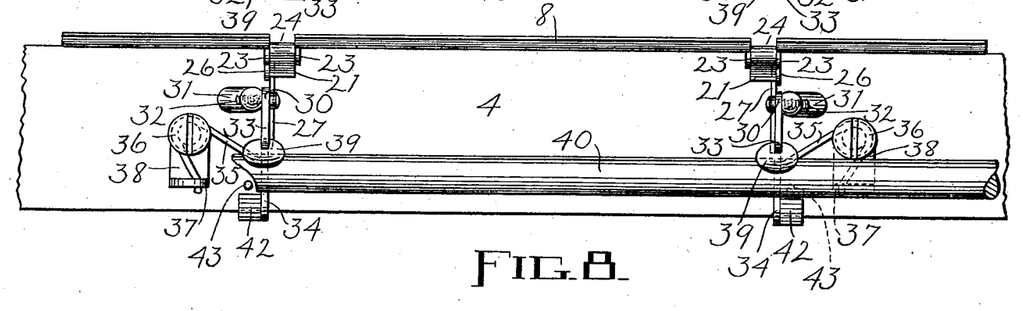
Fig. 8, a rear view of the same.
Figures 9, 10, 11, 12:
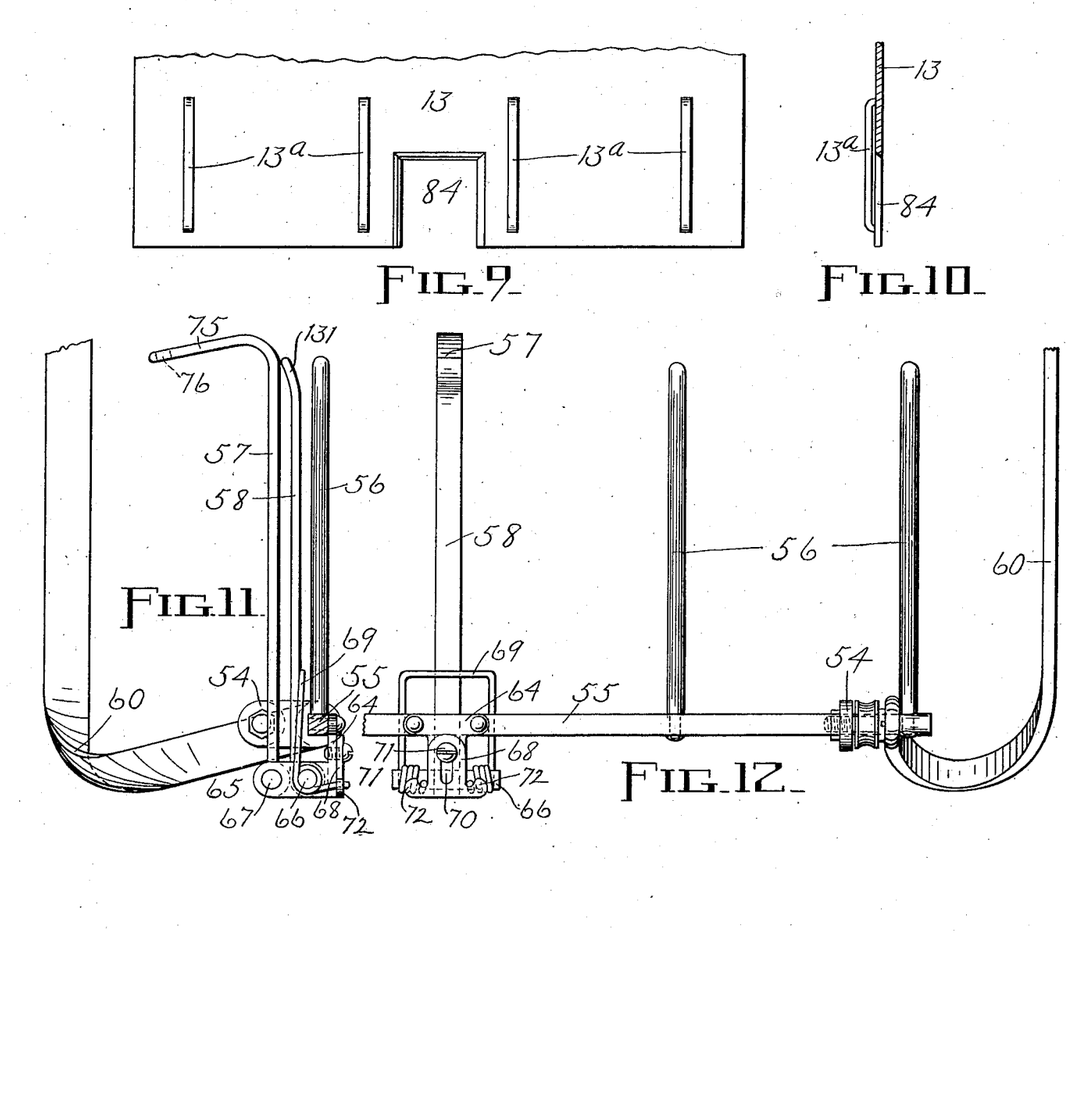

While the cams 39 are out of contact with the arm projections 33, which is during three-quarters and more of each revolution of the main shaft 40, the springs 35 retain the fingers 21 in a substantially vertical position, as shown in Fig. 4, but when said cams encounter the projections 33 they cause the arms 30 to be rocked downward on their pivots 32 and said arms in turn cause said fingers to be swung backward and downward on their pivots 22, through the medium of the links 27, until they assume a horizontal position, as shown in Figs. 5, 6, 7 and 8. As soon as the cams 39 clear the projections 33, the springs 35 act to throw up the arms 30 with the links 27 and the fingers 21, the buffers 43 receiving the foot-pieces 42 and so checking without too much suddenness the upward movement of the parts. Further reference to the fingers 21 will be made in connection with the description of the general operation of the machine.

The combined stop-plate and flap-opener 20 differs little from similar devices which appear in the patent and application herein-before referred to, except that it is bent or bowed slightly in its vertical direction and has its bottom edge beveled from below in front upward to the back, and thus presents a knife-edge to the envelop with which it contacts and bears harder against the same with such edge than with any other portion, with the result that there is no liability of failure on the part of this device to open the flap of the envelop. The plate 20 is supported and operated above the rear edge of the upper envelop support by means of a carrier-bar 45 having a slide 46 at each end mounted to reciprocate vertically on a guide-rod 47, a bar 48 for each slide, and a crank-arm 49 for each bar, the two crank-arms being mounted on opposite ends of a shaft 50. The shaft 50 and the main shaft 40 are both journaled in the sides 1 and 2. The plate 20 has a flap-opening beak 51. Some portion of the plate 20 is always in front of the package of unsealed envelops, therefore it is a stop plate as well as a flap opener. The stop-fingers 21 assist the stop-plate 20, when the latter is elevated, in holding the unsealed envelops in place.

A lug 52, on the inside of each frame upright, and the cross-piece 6 above support a rod 53 which serves as a guide for a slide 54 at the adjacent end of a carrier-bar 55. Stop-pins 56, rising from the carrier-bar 55, are arranged to reciprocate vertically through holes in the cross-piece 6. Envelop gripping-fingers 57 and 58 are also carried by the bar 55, in the manner presently to be described, and they reciprocate through a slot 59 in the cross-piece 6. The carrier-bar and its stop-pins and gripping-fingers receive their vertical movement from a bar 60 and the crank-arm 49 on each side of the machine, said bar being pivotally connected at the base with the corresponding slide 54 and at the top with said crank-arm. The bar 60 is pivoted to the crank-arm 49 at 61, a slot 62 being cut in the side of the frame for such pivotal connection, and the bar 48 is pivoted to said crank-arm at 63. These connections are the same on both sides of the machine. The carrier-bar 55 and the plate 20 rise and fall together through the medium of their connections with the crank-arms 49.

Securely fastened to the front side of the carrier-bar 55 in the middle and depending therefrom is a bracket 64 having two rearwardly-extending arms 65 for pivot pins 66 and 67, the first of said pins being longer that the second. The gripping-finger 57 has its base mounted on the pin 67 and the gripping-finger 58 has its base mounted on the pin 66. On the face of the bracket 64 is a tension regulator or adjuster 68 for a spring 69, such adjuster having a slot 70 therein for a screw 71 which secures it to said bracket, and being provided with two lateral horns 72. The spring 69 is coiled around the projecting ends of the pin 66, extends up in front of the finger 58, and has its ends caught on the horns 72, thereby tensioning said finger toward the finger 67. The amount of force which the spring 69 exerts on the finger 58 is increased and decreased by adjusting the bracket 64 up and down. On the back of the cross-piece 6 is a step 73 for the base of a guide-rod 74 which rod is given a rearward inclination. The upper terminal of the finger 57 is bent backward, as shown at 75, and the rearwardly extending part has a hole 76 therein to receive the guide-rod 74.

It will now be seen that in ascending the gripping-finger 57 will be rocked backward upon its pivot 67 and in descending it will be rocked forward, by reason of the sliding connection which said finger has with the guide-rod 74. The gripping-finger 58, except when actuated against the resiliency of the spring 69, will be forced by said spring into contact with the finger 57 or with an interposed envelop, or will have its upper rearwardly bent terminal forced into such contact, and will rock on its pivot 66 in the same way that said finger 57 rocks on its pivot.

As a means for rocking the gripping-finger 58 against the resiliency of the spring 69, we provide mechanism operated by a cam 77 on the main shaft 40, which will next be described. An operating lever 78 is pivoted at 79 on the inside of the upright 1 with its head 80 in the path of travel of the cam 77. Within the field of action of the tail of the lever 78 is an oscillating arm 81 fast on a rock-shaft 82 journaled in the frame sides. The upper end of the arm 81 is notched to receive the tail of the lever 78. Fast on the same shaft with the arm 81 is a second oscillating arm 83 having a laterally notched terminal to receive the finger 58 which is adapted to slide up and down in such notched terminal. When the cam 77 encounters the head 80 of the lever 78, the latter is operated to swing its tail forward and thus rock the arm 81 forward, which in turn rocks the arm 83 forward by means of the shaft 82, and the arm 83 carries with it the finger 58 against the force of the spring 69, thus separating said finger from the finger 57. And when the cam 77 turns clear of the head of the lever 78, said lever no longer offers any resistance to the spring 69 which latter immediately acts to rock the finger 58, with the arms 81 and 83, backward and restores it to normal position in contact with the other gripping-finger or with an interposed envelop. The cam 77 is so timed relative to the mechanism which operates the carrier-bar 55 as to cause the finger 58 to leave the finger 57 near the end of the upward travel of the fingers, and to permit said finger 58 to close on said finger 57 or on an envelop just before said fingers start down. The depressor-plate 13, which carries the envelops downward one by one to the gripping-fingers, begins to rise about the time the closing of said fingers takes place. This plate 13 has a central recess 84 in the lower part thereof for the accommodation of the gripping-fingers the upper terminals of which enter such recess when said plate is down and said fingers are up.

The depressor-plate 13 is provided on the back near the bottom with vertical ribs 13ª which obviate any liability of adhering to said depressor-plate on the part of the moistened envelop flap, and it is these ribs that press the flap against the backing-plate 12 down which the flap slides as the depressor-plate forces the envelop downward. It is in this way and by means of the depressor-plate 13 and backing-plate 12 that the flap is turned up substantially parallel with the rest of the envelop and so retained in readiness for the gripping-fingers 57 and 58 for the purpose of facilitating the action of the latter when they seize the envelop. Any other suitable means besides the ribs 13ª may be employed for rendering the surface of the depressor-plate with which the moistened gummed surface of the envelop flap contacts uneven, irregular or broken.

The depressor-plate 13 hangs from a carrier-bar 85 which has at each end a slide 86 mounted for vertical reciprocation on a vertical guide rod 87 supported by the cross-piece 3 above and by a suitable lug on the inside of the upright 1 or 2 as the case may be, below. Each slide 86 has a rearwardly-extending arm 88 provided with a pivotally attached slide 89. Arms 90, connected at the top by a rod (not shown), are each pivoted at 99 to either the side 1 or the side 2 inside of the frame, and each slide 89 engages the corresponding arm for the purpose of oscillating the same when said slide travels up and down with the depressor-plate slide 86, the shape of the arm being responsible for this, as will be seen upon referring to Figs. 1 and 4. The two oscillating arms 90 carry a presser-plate 92 which is slotted at 92ª so that it can pass the guide-rod 74 and the gripping-fingers 57 and 58, and at 93 so that it can pass the lower terminal of the backing-plate 12. The plate 92 is elsewhere slotted to enable it to pass the stop-pins 56. This presser-plate is designed to press the envelops together on the lower support to insure the sticking of their flaps, and to move the package on said support far enough forward to allow the pins 56 to come up behind the envelop last deposited on said support.

Two or more straps 94 (one only being shown) are placed on the cross-piece 6 to receive the envelops as they descend, and the presser-plate 92 in its forward movement sweeps the envelops from said straps onto the lower supporting rods 7. And when the stop-pins 56 and the gripping-finger 58 are depressed into their lowest position, the tops of these members pass below the horizontal plane of the straps 94.

The wiper mechanism will be only briefly described since it is the same as what is fully explained in the aforesaid application. The wiper which moistens the flaps of the envelops is represented at 95 at the front end of a reciprocating and oscillating frame 96. The rear end of the frame 96 and of a link 97 on each side of the machine are pivoted to a slide 98 mounted on a horizontal rod 99 supported from the adjacent side of the frame inside. The wiper-support 100 is upheld at each end by a slide 101 mounted with the slide 98 on the rod 99. The wiper-support 100 is actuated forward by the arms 90 and drawn backward by a spring 102 between each slide 101 and the companion link 97. The front end of each link 97 is pivoted to the adjacent arm 90, and the wiper 95 is reciprocated by this means. The wiper is constantly tensioned backward by a spring-pressed piston in a tube 103 on each side of the machine, and is elevated through the medium of an upwardly-tensioned lifter 104 also on each side of the machine. Each tube 103 is pivoted to the adjacent arm 90 and the rod 105 for the piston in said tube is pivoted to the adjacent side of the frame 96. Each lifter 104 has its front end pivoted to the adjacent side of the frame of the machine, and its hooked rear end adapted to be engaged with and disengaged from a pin on the adjacent side of the frame 96. 106 is a stop to limit the upward and forward throw of the lifter 104. The wiper-support is arranged on a level approximately with the envelop-delivery plate 8. The arrangement of parts is such that the wiper 95 contacts with the mass 15 of the reservoir 11 and with the wiper support 100 or the gummed surface of an envelop flap thereon during each cycle of the machine.

Figures 1, 2, 3:
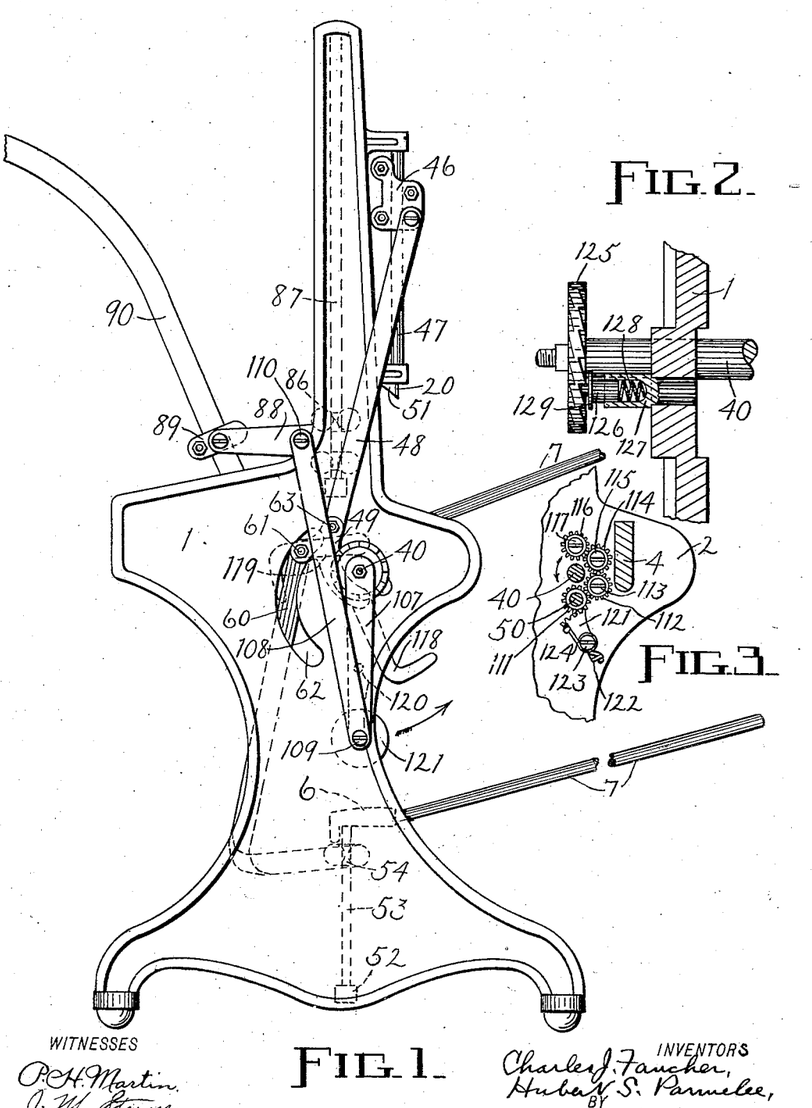
Figure 1 is a side elevation of an envelop machine, showing the ratchet for the actuating mechanism.
Fig. 2, an enlarged detail of said ratchet.
Fig. 3, a view of a fragment of the opposite side of the frame to that which appears in Fig. 1, showing the inner face thereof and the train of pinions which forms part of the actuating or operating mechanism.

The driving or actuating mechanism of the machine comprises the main shaft 40, a crank-arm 107 fast on each end of said shaft, a link 108 connecting each crank-arm with the associated depressor arm 88 to which members it is pivoted at 109 and 110, respectively, a pinion 111 tight on the shaft 50 inside of the upright 2 on the working side of the machine, a pinion 112 on a stud 113 in said upright, the two pinions meshing, a pinion 114 on a stud 115 above said stud 113, the pinions 112 and 114 meshing, a pinion 116 tight on a stud 117 above the main shaft, the pinions 114 and 116 meshing, a trip-arm 118 which is a continuation of the crank-arm 49 on this side of the machine, and a trip-arm 119 fast on the outer end of the stud 117—see Figs. 1 and 3. Both trip-arms are long enough to extend into the path of travel of a pin 120 projecting from the inside of the associated crank-arm 107. A handle 121, by means of which the machine is manually operated, is attached to the pivot 109 on the aforesaid working side of the machine. The action of these operating parts will be explained with the general operation of the machine.

To steady the action of the train of actuating pinions and prevent backlash a frictional resistance device is provided, as shown in Fig. 3, which consists of a toothed segment 121 and a tension regulator or adjuster 122 mounted on a screw 123 with a spring 124. The segment 121 is loose on the screw 123 and the teeth on said segment mesh with the pinion 111. The spring 124 so engages the segment 121 and the adjuster 122 as to put a constant tension on the former. The adjuster 122 is held stationary by the screw 123 after being located at the proper point within its range of rotary adjustment, such point being determined by the amount of force which it is desired to have the spring 124 exert on the segment and pinions. The screw 123 and the adjuster 122 are very similar to the screw 36 and the adjuster 38, both in construction and method of attachment. The segment 121 and spring 124 are mounted on the screw 123 outside of the adjuster 122, that is, said adjuster is between the upright 2 and said segment. The tension of the spring 124 can be changed at any time by simply loosening the screw 123, rotating the adjuster 122 in one direction or the other, accordingly as it is desired to increase or decrease the amount of such tension, and then tightening said screw.

In order to prevent accidentally turning the mechanism backward or in the reverse direction from that in which it is intended to be operated, we provide, as shown in Figs. 1 and 2, a ratchet-wheel 125 on the end of the main shaft 40 which extends beyond the upright 1, and a horizontal spring-pressed pawl or pin 126. The ratchet-wheel 125 is tight on the shaft 40. The pin 126 is loosely supported by a holder 127 driven into the upright below and in advance of the shaft 40, and a spring 128 is introduced into such holder behind said pin to normally force the same outward. The outer end of the pin 126 engages with teeth on the inside face of the ratchet-wheel 125, and said pin is provided with a flange 129 for use when it is desired to release said ratchet-wheel for the purpose of reversing the mechanism. The pin 126 does not interfere with the rotation of the ratchet-wheel 125 when the handle 121 is moved in the direction of the arrow in Fig. 1, since said ratchet-wheel is so constructed that it then clicks past said pin as the ratchet-teeth one after another intermittently force the pin inward against the resiliency of the spring 128 and allow said spring to thrust it outward again. This obviates any liability of operating the mechanism in the wrong direction and so damaging the same or the envelops which may have been placed in the machine. When it becomes necessary, however, to reverse the mechanism for any reason, the pin 126 is thrust inward and held with the thumb or finger by means of the flange 129 so as to permit the ratchet-wheel 125 to be rotated in the opposite direction to that in which it is normally rotated. Upon the release of the pin by the operator it resumes its normal function.

The operation of the new features herein set forth have been quite fully explained and the general operation of the machine as a whole will be clearly understood upon referring to the patent and application to which attention has been called, therefore a brief description of what takes place at each revolution of the crank-arms 107, as operated by the handle 121, is deemed to be sufficient.

The envelops 19 are first placed on the upper support in the manner previously explained, and then the handle 121 is moved in the direction of the arrow in Fig. 1, with the result that the pin 120 actuates the trip-arm 118 and the crank-arms 49 with the links 48 and the bars 60 cause the plate 20 and the pins 56 and the gripping-fingers 57 and 58 to descend, all before said pin 120 rides off of said trip-arm. The stop-fingers 21 are retracted meanwhile. At the same time the crank-arms 49 and links 108 raise the depressor-plate 13 and draw inward the arms 90 through the medium of the intervening mechanism. The parts have now changed from the respective positions which they occupy in Figs. 1 and 4 to those which they occupy in Fig. 5. The plate 20 in its descent engages the flap 130 of the front envelop on the upper support and with the beak 51 presses in open. The presser-plate 92 has moved forward to engage the envelops on the lower support and hold them in position in lieu of the pins 56 which have descended below the top of the horizontal plane of the straps 94 on the cross-piece 6. The arms 90 in their forward movement carry the wiper-support 100 and the wiper 95 in the same direction and tilt up the latter in readiness to come down onto the gummed surface of the flap 130 as soon as said flap shall be pressed down fairly on said wiper-support. Meanwhile the cams 30 pass away from the projections 33 and release the stop-fingers 21 to the springs 35 which throw them up against the under side of the wiper-support. When the wiper-support moves back again and clears the stop-fingers 21, the latter immediately rise in front of the upper package of envelops to prevent them from crowding off of the rear edge of the plate 8. As the handle moves on the arms 90 are drawn still further forward and the wiper 95 drops onto the flap and the wiper-support 100. At the same time the plate 13 is still further elevated and the plate 92 forced still further forward and tightly pressed against the envelops on the lower support to compress them and cause their flaps to adhere securely to the backs. When the pin 120 contacts with and actuates the trip-arm 19, the latter, through the medium of the train of pinions, commences to cause the shaft 50 to rotate whereby the elevation of the plate 20, pins 56, and gripping-fingers 57 and 58 is brought about. During this time the crank-arms 107 and the links 108 begin to draw down the depressor-plate 13 and, through the medium of the arms 90, to move back both the wiper and wiper-support with the envelop flap grasped between them. Before the pin 120 rides off of the trip-arm 119 the plate 20, the pins 56, and the gripping-fingers 57 and 58 have risen to their highest positions.

While the flap of the envelop in transit is in the grasp of the wiper and wiper-support the plate 20 with its beak rises to a position near the top of such envelop, the latter is drawn backward off of the support, and the plate 13 comes down onto said envelop at or near the junction of the flap with the body thereof. This envelop is now held at its upper part between the package on the upper support and the plate 20 and by the flap, as explained, while the plate 13 is on the point of withdrawing said envelop entirely from said package.

As the handle 121 passes on to complete the circle which it is describing, the arms 90 are forced clear back and the wiper is drawn off of the wiper-support and onto the absorbent material 15 in the reservoir 11, where said wiper or the absorbent material which enters into its construction becomes again thoroughly moistened in readiness to moisten the gummed surface of the flap of the next envelop.

The plate 130 has now been depressed into its lowest position, carrying with it the envelop being acted upon the flap of which is turned up and held up by reason of contact with the plate 12. But before this lowest point is reached and as the plate 13 descends it draws the flap from beneath the wiper before the latter leaves the wiper-support and also drags the envelop entirely free from the package of which it formed a part. Directly the plate 13 arrives at its lowest point with the envelop and just before said plate begins its upward travel again, the cam 77 turns clear of the lever 78 when the spring 69 acts to close the gripping-finger 58 on said envelop, as shown in Fig. 4. The flap is now grasped between the two gripping-fingers which come together in the recess 84 in said plate, that is, the gripping-finger 58 closes upon the gripping-finger 57. This performance on the part of the gripping-fingers is possible because when they rose with the bar 55 they were rocked backward by the rod 74 to bring their bite directly beneath the plate 13, and a little before the end of their upward travel was reached the cam 77 acted on the lever 78 to rock the arm 81 forward and to rock said gripping-finger 58 in the same direction, through the medium of the rock-shaft 62 and the arm 83, with the result that the gripping-fingers were open when they approached the descending plate 13.

Further movement of the actuating mechanism results in elevating the plate 13 and in depressing the gripping fingers 57 and 58 with the envelop, which has the freshly moistened flap, tightly grasped between them. Said gripping-fingers carry said envelop down with a positive movement until the bottom edge of the envelop comes to rest on the straps 94, and about at this time the part of the arm 83 which is between the gripping-fingers contacts with the upper portion of the finger 58, which is bent backward slightly, as shown at 131, for this purpose, and wedges said finger 58 away from the finger 57 sufficiently to effect the release of the envelop, otherwise there would be danger of tearing or creasing the envelop at the time of release when it is swept forward onto the lower support. The pins 56 and the finger 58 are now entirely below the horizontal plane of the straps 94 on the cross-piece 6, and the way is clear, for the envelop, between the presser-plate 92 and the lower follower or the package on the lower supporting rods 7. It will be observed that when the gripping-fingers descended they were swung forward again by the rod 74 so that when they reached the end of their downward stroke they were in position to properly locate the envelop on the straps 94 ready for the action of the presser-plate 92. The envelop is securely sealed during the next cycle of the mechanism at the time said presser-plate moves into its extreme forward position, and at this time the package and the follower 16 on the lower or receiving support are forced forward and the pins 56 come up in front of the envelops, the presser-plate being slotted to accommodate them, between which pins and the lower follower the envelops are held when the presser-plate next moves rearward.

What we claim as our invention, and desire to secure by Letters Patent, is—

1. The combination, in an envelop-sealing machine, with a cross-piece of the frame of the machine, of an envelop support consisting of a plurality of slanting rods projecting from said cross-piece, and a horizontal plate over the junction of said rods with the cross-piece, said plate being slotted to receive the rods.

2. The combination, in an envelop-sealing machine, with the frame of the machine, of an envelop support comprising a plurality of slanting rods projecting from said frame, and a gravity follower for envelops on such support, said follower having grooves therein to receive the rods, whereby the follower is held to a straight course and prevented from either leaving the rods or moving laterally thereon out of such course.

3. The combination with envelop supporting rods of an envelop-sealing machine, of a follower comprising two arms having longitudinal grooves in their outer faces, either of said arms being adapted to rest on said rods while the other bears against an envelop or envelops.

4. The combination, in an envelop-sealing machine, with an envelop support, of a finger pivotally mounted adjacent to such support and adapted when in one position to obstruct the passage of an envelop from said support and when in another position to cease from obstructing the passage of the same, resilient means to actuate such finger into one of such positions, and positive means to actuate said finger into the other of such positions.

5. The combination, in an envelop-sealing machine, with an envelop support, of a finger pivotally mounted adjacent to such support and adapted when in one position to obstruct the passage of an envelop from said support and when in another position to cease from obstructing the passage of the same, resilient means to actuate such finger into one of such positions, means to limit the movement of the finger when so actuated, and positive means to actuate said finger into the other of such positions.

6. The combination, in an envelop-sealing machine, with an envelop support, of a pivotally-mounted finger, resilient means to raise such finger into an approximately upright position at the back end of such support, and positive means for intermittently actuating said finger against such resilient means out of its upright position.

7. The combination, in an envelop-sealing machine, with an envelop support, of a pivotally-mounted finger, resilient means to raise such finger into an approximately upright position at the back end of such support, a reciprocating plate above such end of the support, and positive means for intermittently actuating the finger against such resilient means out of its upright position when said plate descends.

8. The combination, in an envelop sealing machine, of an envelop support, a shaft, a pivotally-mounted finger, a spring arranged to raise such finger into an approximately upright position at the back end of such support, and a cam on said shaft adapted to retract said finger.

9. The combination, in an envelop-sealing machine, with an envelop support, of a pivotally-mounted finger, a spring arranged to raise such finger into an approximately upright position at the back end of such support, means to limit the upward movement of said finger, and positive means for intermittently actuating the finger against said spring.

10. The combination, in an envelop-sealing machine, with an envelope support, of a pivotally-mounted finger, a spring arranged to raise such finger into an approximately upright position at the back end of such support, an adjustable buffer adapted to limit the upward movement of said finger, and positive means for intermittently actuating the finger against said spring.

11. The combination, in an envelop-sealing machine, with an envelop support, of a pivotally-mounted finger adapted to be thrown up and down at the back of said support, a spring arranged to actuate such finger in one direction, means for actuating said finger in the opposite direction, and adjusting means for said spring to vary the tension thereof.

12. The combination, in an envelop-sealing machine, of an envelop support, a shaft, a pivotally-mounted finger adapted to rise and fall at the back of said support, a pivotally-mounted arm, a pivotal connection between said finger and arm, a spring arranged to rock said arm in one direction, and a cam on said shaft to rock said arm in the other direction.

13. The combination, in an envelop-sealing machine, with an envelop support, and a cross-piece of the frame of the machine, of a pivotally-mounted finger adapted to rise and fall at the back of said support, a pivotally-mounted arm, a pivotal connection between said finger and arm, a screw tapped into said cross-piece, an adjuster held in place by said screw and adapted to have its position changed, and a spring mounted on the screw with one end in engagement with said arm and the other end in engagement with said adjuster, the tension of said spring on the arm being regulated by the adjuster.

14. The combination, in an envelop-sealing machine, with an envelop support, of a reciprocating stop- and flap-opening plate at the back of and above said support, said plate being bent or bowed perpendicularly.

15. The combination, in an envelop-sealing machine, with an envelop support, of a reciprocating stop- and flap-opening plate at the back of and above said support, said plate being bent or bowed perpendicularly and having a knife-edge.

16. The combination, in an envelop-sealing machine, with a vertically reciprocating depressor-plate for envelops, of reciprocating gripping-fingers adapted to seize an envelop carried down by said depressor-plate.

17. The combination, in an envelop-sealing machine, of a vertically-movable depressor-plate, for envelops, gripping-fingers adapted to seize an envelop carried down by said depressor-plate and carry it still lower and means to actuate the depressor-plate and the gripping-fingers toward and away from each other.

18. The combination, in an envelop-sealing machine, with a constantly reciprocating depressor-plate for envelops, of gripping-fingers adapted to seize an envelop carried down by said depressor-plate and carry it still lower, and means to reciprocate said gripping-fingers with an intermittent motion.

19. The combination, in an envelop-sealing machine, with a reciprocating depressor-plate for envelops, of reciprocating gripping-fingers adapted to seize an envelop carried down by said depressor-plate and carry it still lower, a recess being provided in the depressor-plate to better enable the gripping-fingers to grasp the envelop.

20. The combination, in an envelop-sealing machine, with a vertical fixed backing-plate for envelops, of a reciprocating depressor-plate for envelops operating in front of said backing-plate and adapted to carry an envelop down with its flap between the two plates, said flap being held up by the backing-plate.

21. The combination, in an envelop sealing machine, of a reciprocating depressor-plate for envelops, reciprocating gripping-fingers adapted to seize an envelop carried down by such depressor-plate and carry it still lower, and a backing plate arranged in the path of the flap of the envelop carried down by said depressor-plate to said gripping-fingers for the purpose of turning such flap up against the depressor-plate before the envelop is seized by the gripping-fingers.

22. The combination, in an envelop-sealing machine, with a reciprocating depressor-plate for envelops, of reciprocating and oscillating gripping-fingers arranged to receive an envelop carried down by said depressor-plate and carry it still lower.

23. The combination, in an envelop-sealing machine, with a pair of reciprocating gripping-fingers adapted to handle envelops, of means to open said gripping-fingers for the reception of an envelop between them during their upward travel and to close them upon such envelop about the time they begin to descend.

24. The combination, in an envelop-sealing machine, with a reciprocating depressor-plate for envelops, of a pair of reciprocating-gripping-fingers in operative relation to such depressor-plate and adapted to handle envelops actuated into their field of action by the depressor-plate, means to open said gripping-fingers for the reception of an envelop between them, and means to close the gripping-fingers upon such envelop about the time said depressor-plate begins to rise.

25. The combination, in an envelop-sealing machine, with a pair of reciprocating gripping-fingers for envelops which are normally closed, of means to open said gripping-fingers at both ends of their travel to enable them to seize and release an envelop.

26. The combination, in an envelop-sealing machine, with a pair of reciprocating gripping-fingers for envelops, of means to open and close said gripping-fingers at both ends of their travel for the purpose of seizing and releasing envelops.

27. The combination, in an envelop-sealing machine, with a reciprocating gripping-finger and a fixed guide therefor, of a second reciprocating gripping-finger adapted to operate in conjunction with the first-mentioned gripping-finger to handle envelops, and means to open and close one gripping-finger relative to the other.

28. The combination, in an envelop-sealing machine, with a reciprocating gripping-finger and a fixed guide therefor, of a second reciprocating gripping-finger adapted to operate in conjunction with the first, means to tension said second gripping-finger toward said first gripping-finger for the purpose of grasping and folding an envelop, and means adapted to actuate the second gripping-finger against such tension means away from the first gripping-finger for the purpose of receiving an envelop between the two gripping-fingers and for releasing the same.

29. The combination, in an envelop-sealing machine, with a reciprocating gripping-finger, a fixed guide therefor, a second gripping-finger adapted to operate in conjunction with the first, and a spring arranged to tension said second gripping-finger toward said first-mentioned gripping-finger for the purpose of grasping and holding an envelop, of cam-operated means adapted to actuate the second gripping-finger against the resiliency of said spring away from the other gripping-finger for the purpose of receiving an envelop between them.

30. The combination, in an envelop-sealing machine, with a pair of reciprocating gripping-fingers for envelops, of means to cause said gripping-fingers to travel obliquely.

31. The combination, in an envelop-sealing machine, with a reciprocating carrier-bar, of a bracket supported thereby, a gripping-finger, a fixed guide for such gripping-finger, a second gripping-finger such gripping fingers being adapted to handle envelops, pivotal connections between such bracket and said gripping-fingers, a longitudinally-adjustable adjuster attached to said bracket, and a spring mounted on one of said pivotal connections and arranged to bear on said adjuster and on said second gripping-finger to tension the latter toward said first-mentioned gripping-finger, the amount of tension exerted by said spring on the second gripping-finger being regulated by the adjuster.

32. The combination, in an envelop-sealing machine, with a shaft, a cam on said shaft, a pair of reciprocating gripping-fingers adapted to receive envelops between them, and means to tension one of such gripping-fingers toward the other of said gripping-fingers, of a lever having a head in the path of travel of said cam, and means to actuate the gripping-finger which is under tension against said tension means away from the other gripping-finger when said lever is actuated by the cam.

33. The combination, in an envelop-sealing machine, with a shaft, a cam on said shaft, a pair of reciprocating gripping-fingers adapted to receive envelops between them, and means to tension one of such gripping-fingers toward the other of said gripping-fingers, of a lever having a head in the path of travel of said cam, a rock-shaft, an arm on said rock-shaft adapted to be actuated by the tail of said lever, and a second arm on the rock-shaft in engagement with the gripping-finger which is under tension, the arrangement of parts being such that said last-mentioned gripping-finger is actuated against said tension means away from the other when the lever is actuated by the cam.

34. The combination, in an envelop-sealing machine, with a pair of reciprocating gripping-fingers adapted to receive envelops between them, a fixed guide for one of such gripping-fingers, and means to tension the other of said gripping-fingers toward the first, such second gripping-finger being inclined or bent toward the first gripping-finger, of an arm engaging said second gripping-finger between it and the first and adapted when said gripping-fingers descend to wedge the second away from the first when the inclined or bent portion of the former encounters the engaging part of said arm.

35. The combination, of an envelop-sealing machine, with a slotted cross-piece of the frame of the machine, of a pair of gripping-fingers, adapted to receive envelops between them arranged to reciprocate through the slot in said cross-piece, means to normally retain said gripping-fingers in a closed condition, and means to open them to release an envelop grasped thereby when they deposit said envelop on the cross-piece.

36. The combination, in an envelop-sealing machine, of an envelop-receiving support, a vertically reciprocating depressor-plate for envelops, reciprocating gripping-fingers adapted to grasp an envelop carried down by said depressor-plate, to descend with said envelop and to deposit it on said support, and means to so direct the movement of said gripping-fingers in their descent that the envelop shall be deposited on the support in advance of the vertical plane of the depressor-plate.

37. The combination, in an envelop sealing machine, with the frame and main shaft of the machine, of a ratchet-wheel on said shaft, and a spring-pressed member supported from said frame in engagement with said ratchet-wheel and adapted normally to prevent rotation of the shaft except in one direction.

38. The combination, in an envelop-sealing machine, with the frame and the main shaft of the machine, of a ratchet-wheel on said shaft, a holder projecting from said frame, a pin supported by said holder, and a spring in the holder adapted to thrust said pin into engagement with said ratchet-wheel and thus normally prevent the shaft from being rotated backward.

39. The combination, in an envelop-sealing machine, with the frame and main shaft of the machine, of a ratchet-wheel on said shaft, and a spring-pressed pin supported from said frame in normal engagement with said ratchet-wheel to prevent backward rotation of the shaft, said pin having a projecting part behind its ratchet-wheel-engaging end to afford means for manually forcing the pin out of engagement with the ratchet-wheel.

CHARLES JAMES FANCHER.
HUBERT SYLVESTER PARMELEE.

Witnesses:
NEINEY R. CARTER,
LUCIAN REID.